US006784761B2

(12) United States Patent
Takeda et al.

(10) Patent No.: US 6,784,761 B2
(45) Date of Patent: Aug. 31, 2004

(54) THERMAL TRANSFER SHEET, THERMAL TRANSFER RECORDING METHOD, THERMAL TRANSFER RECORDING SYSTEM, RESONANCE CIRCUIT AND PROCESS FOR PRODUCING THE SAME

(75) Inventors: Hideichiro Takeda, Tokyo-to (JP); Kensuke Shinozaki, Tokyo-to (JP); Taketomo Katai, Tokyo-to (JP); Norikazu Otsubo, Tokyo-to (JP)

(73) Assignee: Dai Nippon Printing Co., Ltd., Tokyo-to (JP)

( * ) Notice: Subject to any disclaimer, the term of this patent is extended or adjusted under 35 U.S.C. 154(b) by 245 days.

(21) Appl. No.: 10/025,109

(22) Filed: Dec. 19, 2001

(65) Prior Publication Data

US 2002/0054201 A1 May 9, 2002

Related U.S. Application Data

(62) Division of application No. 09/404,983, filed on Sep. 22, 1999, now Pat. No. 6,355,598.

(30) Foreign Application Priority Data

Sep. 24, 1998 (JP) ........................................ P10-269457
Mar. 19, 1999 (JP) ........................................ P11-76230

(51) Int. Cl.$^{7}$ ............................ B41M 5/38; H01G 4/40

(52) U.S. Cl. ......................... 333/185; 216/6; 428/195.1

(58) Field of Search ................................ 333/172, 184, 333/185; 156/260, 272.2; 216/6; 428/195.1, 195

(56) References Cited

U.S. PATENT DOCUMENTS

| | | | | | |
|---|---|---|---|---|---|
| 5,294,290 | A | * | 3/1994 | Reeb | 216/6 |
| 5,300,168 | A | * | 4/1994 | Nakao et al. | 156/204 |
| 6,280,544 | B1 | * | 8/2001 | Fox et al. | 156/64 |

* cited by examiner

*Primary Examiner*—Robert Pascal
*Assistant Examiner*—Dean Takaoka
(74) *Attorney, Agent, or Firm*—Ladas & Parry

(57) ABSTRACT

A thermal transfer sheet is equipped with an approval information of being approved as applicable to the predetermined printer. The thermal transfer sheet is set on a printer and, when a determinator determines that the approval information is correct for the printer, the printer is interlocked with the determinator to work the printer in the state where the thermal transfer sheet is set thereon. In the particularly preferable aspect, a recording part of thermal transfer are worked together with the printer and an approval information is destructed by the heating. A mark of an approval information can be formed of a material which can be detected by the light in a visible light region or an invisible region light, a magnetic material, an electrically-conductive material or a resonance circuit. The resonance circuit is preferably formed by thermally transferring an electrically-conductive layer in a predetermined pattern.

1 Claim, 4 Drawing Sheets

(1)

(2)

(3)

(1)

(2)

THERMAL TRANSFER SHEET, THERMAL TRANSFER RECORDING METHOD, THERMAL TRANSFER RECORDING SYSTEM, RESONANCE CIRCUIT AND PROCESS FOR PRODUCING THE SAME

This application is a divisional of Ser. No. 09/404,983 filed Sep. 22, 1999 now U.S. Pat. No. 6,355,598.

BACKGROUND OF THE INVENTION

1. Field of the Invention

The present invention relates to a thermal transfer sheet, a thermal transfer recording method, and a thermal transfer recording system and, more particularly, it relates to a thermal transfer sheet, a thermal transfer recording method, and a thermal transfer recording system, which can regulate a printer so as to limit the use to authentic thermal transfer sheets which received an approval of the quality assurance by a printer manufacturer or the like so that the appropriate printing can be performed in a printer, and which can prevent deterioration of the printing quality and deterioration of a thermal head.

The present invention also relates to a resonance circuit and, more particularly, it relates to a resonance circuit which makes a resonance with a high-frequency wave (electromagnetic wave and the like) and in which an electrically-conductive ink layer is formed in a pattern of the circuit on both sides of an dielectric material by a thermal transfer process, and relates to a process for producing the same.

The resonance circuit and a process for producing the same which are provided by the present invention can be applied to the general uses for a resonance circuit and are suitable, in particular, for the aforementioned thermal transfer sheet imparted with an approval information, and a recording method and a recording system which use the thermal transfer sheet.

2. Description of the Related Art

As a thermal transfer recording medium used for thermal printers, facsimiles and the like, there have been hitherto used thermal transfer sheets in which a thermally transferable layer of a heat meltable ink layer or a sublimation dye layer is provided on one side of a substrate film.

The conventional thermal transfer sheets are the sheets on which a heat meltable ink layer or a sublimation dye layer is provided thereon by using, as a substrate film, a paper such as a condenser paper and a paraffin paper having the thickness of around 10 to 20 $\mu$m or a plastic film such as polyester and cellophane having the thickness of around 3 to 20 $\mu$m and coating on this substrate film a heat meltable ink obtained by mixing a wax with a colorant such as a pigment, a dye and the like or an ink obtained by dispersing or dissolving a sublimation dye in a resin binder.

And printing is performed by heating and pressing predetermined portions by means of a thermal head from a rear side of the substrate film to melt or sublimate an ink layer located corresponding to a printing part among a heat meltable ink layer or a sublimation dye layer and, which is thereby transferred to a printing paper.

In addition, there are generally used continuous thermal transfer sheets in a rolled up form obtained by rolling up on a supply bobbin and adhering an front end of the thermal transfer sheet to a rolling up bobbin. And thermal transfer sheets are contained in a thermal transfer sheet cassette in many cases and are exchanged with a thermal transfer sheet cassette at the end of use of the thermal transfer sheet and recently, however, users simply exchange thermal transfer sheets and cassettes are reused from a viewpoint of the reuse of resources and the like.

In addition, thermal transfer recording media are generally used by rolling up a thermal transfer sheet, connecting a lead film to an end of the final rolling up of the thermal transfer sheet, and adhering an end of the lead film to a reeling up bobbin, which is mounted on a printer. The lead film exerts respective functions such as guidance and pulling up of a thermal transfer sheet which is first used, protection of a rolled unused thermal transfer sheet from the outside the rolling, improvement of the workability and accuracy of mounting when a thermal transfer sheet is mounted on a cassette or directly on a printer, and removal of crease upon rolling up a thermal transfer sheet after use (See JP-A (Kokai)-Hei-6-336065, JP-A-Hei-9(Kokai)-272247 and the like).

In addition, there is disclosed a cassette for a thermal transfer sheet in which a displaying label of the number on which information regarding the number of recordable image planes of the thermal transfer sheet is recorded is applied to a front end of the thermal transfer sheet without connecting a lead film to the thermal transfer sheet (JP-A (Kokai)-Sho-63-68452).

Furthermore, there is disclosed such a thermal transfer sheet cassette that it is not misused in a printer, a light diffracting structure on which information for printing is recorded as a light diffraction image is provided in order to prevent forgery, the surface of the light diffracting structure is formed to be on the same level of that of the cassette case or on the more recessed level than that of the case surface, and the light diffracting structure having the fragility is used (JP-A(Kokai)-Hei-8-318657, JP-A(Kokai)-Hei-8-318658).

There are many kinds of thermal transfer printers and required to have the excellent printing quality such as the clearness of a printed image, high density, high sensitivity and the like. To the contrary, an amount of a thermal transfer sheet to be used in a printer has been increased and many products which did not received an approval of the quality assurance by printer manufacturers or the like, that is, a thermal transfer sheet which is not authentic called as a pirated article are on the market.

When this pirated article is used in a printer, it is inferior in the matching properties with the printer, and deterioration of the printing quality and deterioration of a thermal head occur frequently, leading to problems.

However, in the thermal transfer sheet with the lead film as described above, the misuse can be prevented and operations can be made easy upon mounting on a printer, but it can not be regulated that the use of it in a printer is limited to thermal transfer sheets which received an approval of the quality assurance by printer manufacturers or the like, that is, authentic thermal transfer sheets so that appropriate printing can be performed for the printer.

In addition, when the aforementioned displaying label of the number of the sheets on which information regarding the number of recordable image planes is recorded is applied to a front end of a thermal transfer sheet, a printer can provide information regarding the number of recordable image planes but it can not be regulated that the use of it in the printer is limited to authentic thermal transfer sheets.

In addition, the provision of a light diffracting structure on which information for printing is recorded as a light diffracting image in the aforementioned cassette case is assumed that exchange is made with a cassette when the use of a thermal transfer is completed and the thermal transfer sheet is exchanged with a new one and, therefore, when a cassette case is opened and a thermal transfer sheet contained therein is exchanged with not authentic one for use, it can not be regulated that the use is limited to authentic thermal transfer sheets.

On the other hand, there has been hitherto known a discriminating system in which an apparatus for transmitting and receiving a high frequency-wave of the particular frequency (electromagnetic wave and the like) is combined with a card or a tag having a resonance circuit which is responsive by a radio format in order to manage peoples who come to and go out from the particular places and manage the movement and the discrimination of articles in a physical distribution stage.

The resonance circuit is fundamentally composed of a coil-like circuit on at least one side of a plastic film as a dielectric material and a circuit for a condenser electrode plate or a coil-like circuit which also functions as a condenser on the other side of the film. Alternatively, there is a resonance circuit in which a condenser electrode plate part is not provided at an end of a coil-like circuit, coil-like circuits are formed on both sides of the film so that the circuits hold a plastic film between them so as to correspond to each other and, as result, the circuit itself plays a role as a condenser electrode plate.

The resonance circuit is composed of a resistance R, an inductance L and an electrostatic capacity (condenser capacity), the condenser capacity C is formed of a plastic film which is a dielectric material and a metal foil such as a coil-like circuit and the like formed on both sides thereof, and the resistance R is formed of a metal foil which forms a circuit. Therefore, in order to obtain the predetermined resonance frequency necessary for a resonance circuit, the parts construction having the high accuracy of the dimensions and the position is required.

From the above point of view, a coil-like circuit has been hitherto formed by laminating a metal foil such as aluminum foil and the like on one side or both sides of a plastic of a dielectric material, printing the predetermined pattern on a metal foil on a plastic film with an ink having the high resistance to etching as in a process for manufacturing a printed-wiring board, and etching with a chemical solution such as an acid, an alkali and the like or performing a photoresist etching method.

However, this etching method with a chemical solution necessitates a period of time until a metal foil is dissolved out, and there are many problems that a wasting treatment for an etching solution and the necessary facilities for an etching step become a large scale.

In addition, in a printed-wiring board and the like, there is a method by punching a thick metal foil in the predetermined circuit pattern, which is adhered to a substrate. However, in this method, since the metal foil is thick, the flexibility is lacked and this method is not suitable for this articles such as a resonance tag and the like. A resonance circuit manufactured by this method is relatively thick and lacks the flexibility and, therefore, is not suitable for applying on a thermal transfer sheet.

In addition, it is performed that a coil-like circuit of a resonance circuit is formed on a dielectric material with a silk screen printing and, however, a printing edge of a circuit pattern is not sharp and a blur is produced at a printing edge upon impressing an ink onto a dielectric material by rubbing with a squeegee. Thus, there is a problem that a circuit having the high positional accuracy can not be obtained.

SUMMARY OF THE INVENTION

Therefore, a first object of the present invention is to solve the aforementioned problems and provide a thermal transfer sheet, a thermal transfer recording method, and a thermal transfer recording system, which can regulate so as to limit the use to the authentic thermal transfer sheets which received an approval of the quality assurance by printer manufacturers or the like so that appropriate printing can be performed in a printer, and which can prevent deterioration of the printing quality and deterioration of a thermal head.

A second object of the present invention is to provide a resonance circuit having the high dimensional and positional accuracy of parts, and having the stable resonance properties, which can be applied, for example, to a resonance tag and a card and, particularly, can be appropriately utilized as a discriminating mark for thin articles, and having the high productivity, as well as a process for manufacturing such the resonance circuit.

In order to accomplish the aforementioned first object, in principle, a thermal transfer sheet relating to the present invention is characterized in that it is provided with an approval information showing that it is approved as applicable to the predetermined printer.

In addition, in principle, a thermal transfer recording method relating to the present invention is characterized in that it comprises the steps of:

setting a thermal transfer sheet provided with an approval information that it is approved as applicable to the predetermined printer on a printer;

confirming the aforementioned approval information from a determinator; and, interlocking the printer with the determinator to be worked in the state where the thermal transfer sheet is set thereon when the determinator determines that the aforementioned approval information is correct for the printer.

Furthermore, a thermal transfer recording system relating to the present invention comprises a printer and a determinator and is characterized in that, an approval information that it is approved as applicable to the predetermined printer which has been given in advance to a thermal transfer sheet is confirmed from the determinator, and when the determinator determines that the approval information is correct for the printer, the printer is interlocked with the determinator to be worked in the state where the thermal transfer sheet is set thereon.

The actions of the present thermal transfer sheet, recording method and recording system are as follows:

In the present invention, an approval information identifying that a thermal transfer sheet is an authentic article is given in advance to the thermal transfer sheet with a thermally transferable layer provided on a substrate film. A thermal transfer sheet equipped with the approval information is set on the corresponding printer and a determinator interlocking with the printer is made to detect the approval information. If the determinator determines that the approval information is correct for the printer, the printer is interlocked with the determinator to be worked in the state where the thermal transfer sheet is set thereon.

Therefore, according to the present invention, since a printer can be regulated so that the use of a thermal transfer sheet is limited to the thermal transfer sheets which received an approval of the quality assurance by a printer manufacturer or the like, appropriate printing can be performed and, as a result, the deterioration of the printing quality and the deterioration of a thermal head can be prevented.

In the present invention, a mark which is coded from the aforementioned approval information may be unseparatably provided with a thermal transfer sheet. And, the aforementioned determinator can be made detect the mark to determine the truth of the approval information.

The mark of the approval information may be unseparatably provided on the thermal transfer sheet or on a lead film at front end of the thermal transfer sheet, or provided on a case for the thermal transfer sheet, or provided on an independent support such as a card and the like to detachably combine with the thermal transfer sheet or the case. However, when the mark of the approval information can be separated from the thermal transfer sheet, the unjust use of the mark is relatively easy. To the contrary, when the mark and the thermal transfer sheet are provided unseparatably, it becomes difficult to use an approval information identifying the thermal transfer sheet for an another thermal transfer sheet, being preferable.

The mark is preferably provided unseparatably at a front end of a thermal transfer sheet. When the mark is provided at a front end of the thermal transfer sheet, the mark can be easily and rapidly detected in the state where the thermal transfer sheet is set on a printer.

The mark may be formed of a material which can be destructed with the energy given from the outside. A thermal transfer sheet having such a destructible approval mark is set on a printer, and a determinator interlocking with a printer is made to detect the approval mark. When the determinator determines that the approval mark is correct for the printer, the printer and a destructor are interlocked with the determinator to work the printer in the state where the thermal transfer sheet is set on the printer and at the same time, the mark is destructed by giving the energy to the mark from the destructor.

In this embodiment, at a time when the thermal transfer sheet is permitted by the printer, the approval mark of the thermal transfer sheet is destructed and it can no longer be detected to be correct. Therefore, according to this embodiment, a printer can be regulated so that the use of a thermal transfer sheet is limited to only thermal transfer sheets which received an approval and, additionally, a mark for identifying that a thermal transfer sheet is an authentic article can be prevented from being reused or misused by replacing the mark with another one or applying the mark on another thermal transfer sheet.

The mark may be formed of a material which can be destructed with such a degree of heat that can be released from a printer. In this case, a recording part of the printer as the destructor interlocking with the determinator is worked and the heat can be given to the mark from the recording part to destruct the mark. When a recording part of a printer serves as a destructor for an approval mark, it is not necessary to prepare an independent destructor or mount an independent destructor.

The mark may be provided at a position overlapping with a thermally transferable layer of the thermal transfer sheet, at a front part of the thermal transfer sheet. And, the thermal transfer sheet is set on a printer, a determinator interlocking with the printer is made to detect an approval mark. When the determinator determines that the approval mark is correct for the printer, the printer and a destructor are interlocked with the determinator to overlay the thermal transfer sheet on a receiving sheet in the printer and the heat is given to the approval mark from the recording part to destruct it. In this embodiment, a thermally transferable layer which is positioned at an approval mark is transferred to a receiving sheet at the same time with the destruction of the approval mark. As a result of printing, the destruction of the approval mark can be confirmed.

Although the mark may be either a mark detectable with the visible light or an invisible mark which can not be detected with the visible light, the invisible mark is preferable because the forgery and the misuse are difficult.

The invisible mark can be formed of a material detectable with any one of detecting mediums and detective means other than the visible light. The invisible mark may be made to be detectable by absorbing or emitting an ultraviolet ray or an infrared ray. Alternatively, the invisible mark may be made to be detectable by imparting the electromagnetic properties in response to a microwave. The invisible mark may be a mark containing a magnetic material or an electrically-conductive material.

As the mark, there may be used a resonance circuit which makes a resonance with a received high-frequency wave to transmit an echo wave. When a resonance circuit is used, at least a part of an electrically conducting path of the resonance circuit may be formed of a material containing a low melting point metal which is meltable with the heat applied from a recording part of a printer and, thereby, the destruction becomes possible by giving the heat from the recording part as a destructor.

In order to accomplish the aforementioned second object, a resonance circuit relating to the present invention is characterized in that it is provided with at least a dielectric material, a coil-like circuit dispose on one side of the dielectric material and a circuit for a condenser electrode plate or a coil-like circuit which also serves as a condenser and, at the same time, the coil-like circuit, the circuit for a condenser electrode plate and the coil-like circuit which also serves as a condenser are formed by thermally transferring a thermal transferable electrically-conductive layer of an electrically-conductive layer transfer sheet on the dielectric material in the predetermined pattern.

In addition, a process for manufacturing a resonance circuit relating to the present invention comprises the steps of:

- overlaying an electrically-conductive layer transfer sheet having a thermally transferable electrically-conductive layer over one side of a dielectric material with the thermally transferable electrically-conductive layer facing with the dielectric material, and then thermally transferring the thermally transferable electrically-conductive layer on the dielectric material in the predetermined pattern, to form a coil-like circuit; and,
- overlaying the electrically-conductive layer transfer sheet over the other side of the dielectric material with the thermally transferable electrically-conductive layer facing with the dielectric material, and thermally transferring the thermally transferable electrically-conductive layer on the dielectric material in the predetermined pattern, to form a circuit for a condenser electrode plate or a coil-like circuit which also serves as a condenser.

According to the above process for manufacture, a resonance circuit having the high dimensional and positional accuracy of parts and the stable resonance properties and which is thin and rich in the flexibility can be easily and effectively manufactured. Further, according to the above process for manufacture, a resonance circuit which is rich in the flexibility and is thin can be obtained like an etching method and, at the same time, the productivity is higher, the production facilities are compact and it is not necessary to waste an etching solution as compared with an etching method.

A resonance circuit of the present invention obtained by the process for manufacture has the high dimensional and positional accuracy of parts and the stable resonance properties and can be applied, for example, to a resonance tag or card and, particularly, can be appropriately used as a discriminating mark for thin articles such a thermal transfer sheet, being also highly productive.

The present resonance circuit can be applied to the thermal transfer sheet as an approval mark in order to accomplish the first object of the present invention.

One embodiment of a thermal transfer sheet having a resonance circuit as an approval mark is characterized in that the resonance circuit is provided with at least a dielectric material, a coil-like circuit disposed on one side of the dielectric material and a circuit for a condenser electrode plate or a coil-like circuit which also serves as a condenser disposed on the other side of the dielectric material and the coil-like circuit, the circuit for a condenser electrode plate and a coil-like circuit which also serves as a condenser are formed by thermally transferring a thermally transferable electrically-conductive layer of an electrically-conductive layer transfer sheet on the dielectric material in the predetermined pattern, and the resonance circuit with such a configuration is fixed at a front end of the thermal transfer sheet.

In addition, in an another embodiment, a resonance circuit is provided with at least a lead film which serves as a dielectric material, a coil-like circuit disposed on one side of the lead film and a circuit for a condenser electrode plate or a coil-like circuit which also serves as a condenser disposed on the other side of the lead film, and the coil-like circuit, the circuit for a condenser electrode plate and the coil-like circuit which also serves as a condenser are formed by thermally transferring a thermally transferable electrically-conductive layer of an electrically-conductive layer transfer sheet on the dielectric material in the predetermined pattern, and the lead film is connected to a front end of the thermal transfer sheet.

DETAILED DESCRIPTION OF THE PREFERRED EMBODIMENT

Embodiments of the present invention will be explained below.

First, a thermal transfer sheet, a thermal transfer recording method and a thermal transfer recording system for accomplishing the first object of the present invention are explained.

Figure 1:
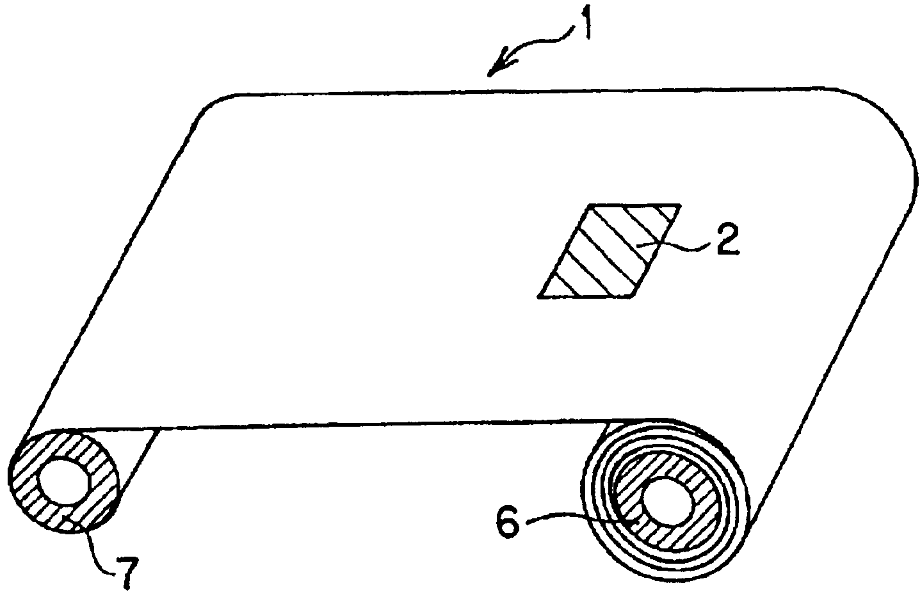
FIG. 1 is a perspective view showing one embodiment of a thermal transfer sheet of the present invention.
Figure 2:
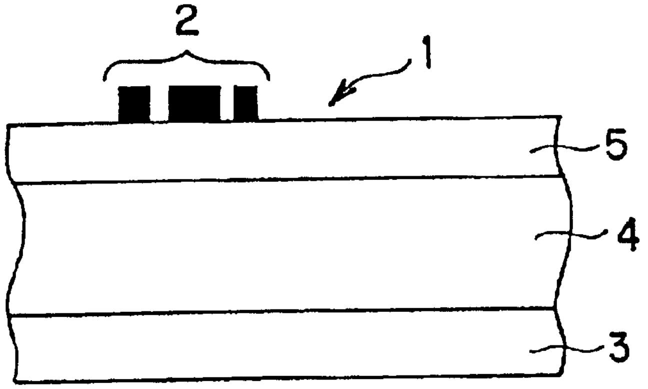
FIG. 2 is a cross-sectional view showing one embodiment of a thermal transfer sheet of the present invention.

In one embodiment of the present thermal transfer sheet, an end of the final rolling of a thermal transfer sheet 1 rolled up on a supply bobbin 6 is adhered to a rolling up bobbin 7 and a mark 2 is formed on a front end of a thermal transfer sheet 1 as shown in FIG. 1.

In addition, in the present thermal transfer sheet, one side of a substrate film 4 is provided with a thermally transferable layer 3 and the other side of the substrate film 4 may be provided with a rear layer 5 for improving the heat resistance and the slipping ability in the contact with a thermal head upon printing, and a mark 2 (approval mark) identifying that a thermal transfer sheet 1 is an authentic article may be provided on a rear layer 5.

Substrate Film

As the substrate film 4 used in the thermal transfer sheet of the present invention, the same substrate sheets as those used in the conventional thermal transfer sheets may be used as they are, and other substrate films may be used, not being limited in particular.

Examples of the preferable substrate films include plastics such as polyester, polypropylene, cellophane, polycarbonate, cellulose acetate, polyethylene, polyvinyl chloride, polystyrene, nylon, polyimide, polyvinylidene chloride, polyvinyl alcohol, fluorine resin, chlorinated rubber, ionomer and the like; papers such as condenser paper, paraffin paper and the like; nonwoven cloth and the like; and substrate films obtained by complexing these films.

Although the thickness of the substrate film may appropriately varies depending upon materials so that the strength and the thermal conductivity become suitable, the thickness is preferably, for example, 2 to 25 μm.

Rear Layer

In addition, a rear layer 5 may be provided on the other side of the substrate film in order to prevent the adhesion of a thermal head and improve the slipping ability.

This rear layer is formed from a material prepared by incorporating a slipping agent, a surfactant, an inorganic particle, an organic particle, a pigment and the like into a binder resin.

As the binder resin used in the rear layer, there are, for example, cellulose resins such as ethyl cellulose, hydroxyethyl cellulose, hydroxypropyl cellulose, methyl cellulose, cellulose acetate, cellulose acetate butyrate and cellulose nitrate; vinyl resins such as polyvinyl alcohol, polyvinyl acetate, polyvinyl butyral, polyvinyl acetal, polyvinyl pyrrolidone, acrylic resin, polyacrylamide and acrylonitrile-styrene copolymer; polyester resin; polyurethane resin; silicone-modified or fluorine-modified urethane resin and the like.

Among them, it is preferred to use a cross-linked resin obtained by using a binder resin having a few reactive groups such as hydroxy in combination with polyisocyanate as a cross-linking agent.

In order to form a rear layer, a slipping agent, a surfactant, an inorganic particle, an organic particle, a pigment and the like are added to the binder resin, which is dissolved or dispersed in an appropriate solvent to prepare a coating solution, which is coated by the conventional coating means such as a gravure coater, a roll coater and a wire bar, followed by drying.

Thermally Transferable Layer

The thermal transfer sheet of the present invention comprises a thermally transferable layer 3 provided on one side of a substrate film and the thermally transferable layers are classified into two kinds of a heat meltable ink layer and a sublimation dye layer.

First, as the heat meltable ink layer, there are used heat meltable ink layers which comprises a colorant and a binder which have been previously known and in which, if necessary, various additives such as a mineral oil, a vegetable oil, higher fatty acid such as stearic acid and the like, a plasticizer, a thermoplastic resin, a filler and the like are added hereto.

As a wax component used as a binder, there are, for example, microcrystalline wax, carnauba wax, paraffin wax and the like. Furthermore, various waxes such as Fischer-Tropsch wax, various low-molecular polyethylene, Japan tallow, bees wax, spermaceti, insect wax, wool wax, shellac wax, candelilla wax, petrolatum, polyester wax, partially modified wax, fatty acid ester, fatty acid amide and the like are used. Among these, waxes having a melting point of 50 to 85° C. are preferable. When a melting point is less than 50° C., there arises a problem on the storing properties, while when a melting point is more than 85° C., the sensitivity becomes insufficient.

As a resin component used as a binder, there are, for example, ethylene-vinyl acetate copolymer, ethylene-acrylic acid ester copolymer, polyethylene, polystyrene, polypropylene, polybutene, petroleum resin, vinyl chloride resin, vinyl chloride-vinyl acetate copolymer, polyvinyl alcohol, vinylidene chloride resin, methacrylic resin, polyamide, polycarbonate, fluorine resin, polyvinyl formal, polyvinyl butyral, acetyl cellulose, nitrocellulose, polyvinyl acetate, polyisobutylene, ethyl cellulose, polyacetal and the like. In particular, the resin components which have been conventionally used as a heat-sensitive adhesive and have a relatively low softening point, for example, a softening point of 50 to 80° C. are preferable.

A colorant can be appropriately selected from the known organic or inorganic pigments and dyes. For example, colorants having the sufficient coloring density and which do not undergo color change and color deterioration by the light, the heat and the like are preferable. Alternatively, substances which develop color by heating, and substances which develop color by contacting with components previously coated on the surface of a transfer body may be used. The color of the colorants are cyan, magenta, yellow and black and are not limited to them. The colorants having various colors can be used.

Furthermore, in order to impart the better heat conducting properties and heat meltable properties to the heat meltable ink layer, a heat conductive substance as a filler for the binder may be incorporated therein. Examples of such the filler are carbonous substances such as carbon black and the like, and metals and metal compounds such as alminium, copper, tin oxide, molybdenum disulfide and the like.

The heat meltable ink layer is formed by blending the above colorant component and the binder component as well as, if needed, a solvent component such as water, organic solvent and the like to prepare a coating solution for forming a heat meltable ink layer, which is coated with the previously known hot melt coating, hot lacquer coating, gravure coating, gravure reverse coating, roll coating or the like. Alternatively, the heat meltable ink layer may be formed by using an aqueous or non-aqueous emulsion coating solution.

The thickness of the heat meltable ink layer should be decided such that the necessary printing density and heat sensitivity are harmonized. The thickness is usually in a range of 0.1 $\mu$m to 30 $\mu$m in the dried state, preferably around 1 $\mu$m to 20 $\mu$m.

Next, the sublimation dye layer is a layer in which a sublimation dye is carried in the binder resin. Any sublimation dyes which have been conventionally known and used for thermal transfer sheets can be effectively used in the present invention, being not limitative. For example, as some preferable dyes, there are MS Red G, Macrolex Red Vioret R, Ceres Red 7B, Samaron Red HBSL, Resolin Red F3BS and the like as a red dye, and Phorone Brilliant Yellow 6GL, PTY-52, Macrolex Yellow 6G and the like as a yellow dye, Kayaset Blue 714, Waxolin Blue AP-FW, Phorone Brilliant Blue S-R, MS Blue 100 and the like as a blue dye.

As the binder resin for carrying the sublimation dyes as described above, the previously known binder resins can be all used. Examples of the preferable binder resins are cellulose resins such as ethyl cellulose, hydroxyethyl cellulose, ethylhydroxy cellulose, hydroxypropyl cellulose, methyl cellulose, cellulose acetate, cellulose acetate butyrate and the like; vinyl resins such as polyvinyl alcohol, polyvinyl acetate, polyvinyl butyral, polyvinyl acetal, polyvinyl pyrrolidone, polyacrylamide and the like; polyester and the like.

Alternatively, the sublimation dye layer may contain various conventionally known additives in addition to the aforementioned dyes and binder resins as necessary.

And the sublimation dye layer is formed by adding the aforementioned dyes, binder resins and additives in an appropriate solvent to dissolve or disperse respective components, to prepare an ink which is coated on the aforementioned substrate film with the same conventionally known coating methods as those described for the heat meltable ink layer to form a sublimation dye layer.

The thickness of the sublimation dye layer is usually 0.1 to 5.0 $\mu$m in the dried state, preferably around 0.4 to 2.0 $\mu$m.

(Mark)

The thermal transfer sheet of the present invention is provided with a mark 2 identifying that the thermal transfer sheet is authentic, that is, a mark which is coded from an approval information.

Although the mark 2 may be either a mark detectable with the visible light or an invisible mark undetectable with the visible light, the invisible mark is preferable because forgery and misuse are made difficult. The invisible mark can be formed from material detectable with any one of detecting medium and means other than the visible light. As the invisible mark, the marks having the particular optical properties in an ultraviolet region or an infrared region can be used. Alternatively, the mark having the electrical conductivity, and the mark having the magnetic properties in response to microwave can be used as the invisible mark.

Further, the marks having a resonance circuit which receives a high-frequency wave and makes a resonance to transmit an echo wave can be used in the thermal transfer sheet.

The mark 2 may be provided unseparatably on the thermal transfer sheet or a lead film connecting to the front end of a thermal transfer sheet, or may be provided unseparatably in a case for a thermal transfer sheet, or may be provided on an independent support such as a card and the like to detachably combine with a thermal transfer sheet or its case.

When the mark 2 is separatable from a thermal transfer sheet, since the injustice use of the mark is relatively easy, it is preferable to adopt an invisible mark or a resonance circuit in order to make reading, forgery and injustice use of the mark difficult.

On the other hand, when the mark 2 is provided unseparatably from a thermal transfer sheet as shown FIG. 1, it becomes difficult to use an approval information identifying the thermal transfer sheet for an another thermal transfer sheet, being preferable.

It is preferred that the mark 2 is unseparatably provided at a front end of a thermal transfer sheet. For example, the mark 2 may be directly provided at a front end of a thermal transfer sheet, or a lead film provided with the mark 2 may be connected to a front end of a thermal transfer sheet. When the mark is provided at a front end of a thermal transfer sheet, the mark can be detected easily and rapidly in the state where the thermal transfer sheet is set on a printer.

In addition, it is preferable that, from a viewpoint of restriction of a space for arranging an energy imparting means for destructing a mark (destructor) and the manufacturing conditions for forming a mark, the mark 2 is provided on a side opposite to a thermally transferable layer of a thermal transfer sheet, that is, on a rear side of a substrate film.

The mark 2 of a thermal transfer sheet 1 shown in FIG. 1 can be destructed in a printer by applying the energy thereto. When the mark 2 is destructed in a printer, it becomes impossible to reuse or misuse by applying the mark 2 to an another thermal transfer sheet, being preferable.

A part or an entire of the mark 2 may be formed of a material which can be destructed with such a degree of the heat that can be released from a recording part of a printer. In this case, since a recording part of a printer can serve as a destructor for an approval mark, it is not necessary to prepare an independent destructor or prepare a space for arranging an independent destructor.

In order to make a part or an entire of the mark 2 destructable with the energy from the outside, particularly, such a degree of the heat that can be released from a printer, for example, a mark is formed of a mark material obtained by mixing with a binder resin having a relatively low melting point, or at least a part of an electrically conducting path of a resonance circuit is formed of low melting point metal only or an electrically-conductive material containing a low melting point metal at an effective amount. Alternatively, as a component to be detected with a determinator, that is, a component having the particular optical properties in an infrared ray region or an ultraviolet ray region, components which are easily thermally degraded or thermally deteriorated are selected and a mark may be formed of a mark material obtained by mixing with such the component to be detected. When a mark containing a detection component having the low heat resistance is heated, since a detection component in a mark is degraded or deteriorated, the pattern of the mark dose not change but the function as an approval mark is destructed.

A mark for identifying an authentic article and having the particular optical properties in an ultraviolet ray region or an infrared ray region absorbs the light at those wavelength regions or emits the fluorescent light. The mark which can not be read with the visible light and is an invisible information makes it difficult to manufacture not authentic thermal transfer sheets, so-called pirated thermal transfer sheets and, thus, being preferable.

It goes without saying that “absorption” herein is required not to have the same absorption properties as those of a portion of the thermal transfer sheet where the mark is not provided. If it is the same in a detecting wavelength regions, since the mark formed on the thermal transfer sheet has no difference in properties relative to the light at these wavelength regions, the mark becomes unperceivable. In addition, the wavelength region having the particular optical properties may be the wavelength region of only ultraviolet ray, of only infrared ray, or of both ultraviolet ray and infrared ray.

In addition, when the a mark as an invisible information is formed on a transparent thermal transfer sheet or on a lead film connected to a front end of a thermal transfer sheet, the mark may be perceived not with an amount of the reflected light but with that of the transmitted light at the particular wavelength. In such a case, an amount of the transmitted light is decreased by shield depending upon the absorbing properties and the mark can be perceived with the decreased amount of the transmitted light.

Examples of a material which forms the mark of the thermal transfer sheet of the present invention are not limited as long as it includes the materials having the particular optical properties in an ultraviolet ray region or an infrared ray region. More particularly, for example, an ultraviolet absorber of an organic compound or an inorganic compound can be used as a transparent perceiving substance. When such the ultraviolet absorber is used, the ultra violet absorber absorbing the light in ultraviolet ray region of not greater than 380 nm is good as long as it is not the same color as that of a portion adjacent to the mark. This is because, when the material has the absorbing properties in a wavelength region of greater than 380 nm, the material tends to be colored in a visible light region, which makes possible the determination with naked eyes. Alternatively, the material may be a fluorescent substance which emits the fluorescent light.

As the ultraviolet absorber used as a perceiving substance, examples of the specific substance in the case of the organic compound are benzophenones, benzotriazoles, oxalic acid anilides, cycnoacrylates, salicylates and the like. Alternatively, when the inorganic compound is used, examples thereof are finely-divided powders of metal such as zinc oxide, iron oxide, magnesium oxide, titanium oxide, tin oxide, cerium oxide and the like, and of metal oxide such as transition metal and alkaline earth metal. By using the finely-divided powders having the particle size of not greater than 0.2 $\mu$m, preferably not greater than 0.1 $\mu$m, particularly preferably 0.05 $\mu$m, the transparency can be obtained in a visible light region. When the particle size approaches a visible light region above 0.2 $\mu$m, the color characteristic of respective finely-divided powders is developed in some cases but even such the perceiving substance can be preferably used when it has the color close to that of a portion adjacent to the mark. In such the case, the particle size may be not greater than 5 $\mu$m.

Among the aforementioned ultraviolet absorbers, preferable is such one as easily destructed when the energy is applied to the mark from a thermal transfer printer. For example, it is preferred that the sensor level is set in advance so that the mark is not detected again with an ultraviolet sensor, by applying the heat energy from a thermal transfer printer to melt, deteriorate or degrade an ultraviolet absorber. As such the ultraviolet absorber that is melt, deteriorated or degraded with the heat, finely-divided powders of a metal oxide having a low melting point such as zinc oxide, tin oxide and the like are preferable and, in particular, an ultraviolet absorber of an organic compound is more preferably used.

In addition, as the perceiving substance which absorbs an infrared light, there are organic dyes. As a dye having the absorption in an infrared ray region, for example, cyanine dye, phthalocyanine dye, naphthoquinone dye, anthoraquinone dye, dithiol dye, triphenylmethane dye and the like can be used. However, since these dyes have the absorption band at the wavelength region of not less than 600 nm, they display cyan color, or since they have around 30 to 40% absorption in a visible region (380–700 nm), they display slightly reddish cream color. For this reason, the completely colorless transparent printing information can not be obtained but, when it is the same color series as that of a portion adjacent to the mark, it is not striking and, thus, can be used.

In addition, as the fluorescent substance used as the perceiving substance, there are, for example, inorganic fluorescent compounds comprising zinc sulfide, zinc oxide and the like. However, since they are white or colored, when the color is the same as that of a portion adjacent to the mark, they may be used in some cases. In other cases, even when they are used, the formed images become white or colored as long as their concentrations are not extremely low, which results in difficulty in the formation of an invisible image because the image becomes white or with color.

As the other preferable fluorescent substances, there are, for example, the known fluorescent brightening agent such as stilbenes, diaminodiphenyls, oxazoles, imidazoles, thiazoles, coumarins, naphthalimides, thiophenes and the like. Also in this case, it is preferred that, sililarly to the ultraviolet absorber, the fluorescent brightening agent has no absorption in a visible region, or has small absorption, and is not excited by the visible light to emit the fluorescent light, or has the properties that the fluorescent emission is small in the visible region. The better wavelength region for fluorescent emission is not greater than 380 nm.

Among the aforementioned infrared absorbers and fluorescent substances, preferable is such one as easily destructed when the energy is applied to the mark from a thermal transfer printer. For example, it is preferred that the sensor level is set in advance so that the mark is not detected again with an infrared sensor or an ultraviolet sensor, by applying the heat energy from a thermal transfer printer to melt, deteriorate or degrade an ultraviolet absorber or a fluorescent substance. As such the ultra violet absorber or the fluorescent substance that is melt, deteriorated or degraded with the heat, more specifically, an infrared absorber of an organic compound or a fluorescent substance of an organic compound is preferably used.

A mark can be composed of the perceiving substance and the binder described above. As a binder resin for the mark, the resins which are substantially transparent to the visible light are preferably used. As such the resin, there may be used various thermoplastic resins, for example: polyethylene resins such as polyethylene (PE), ethylene-vinyl acetate copolymer (EVA), vinyl chloride-vinyl acetate copolymer or the like; polypropylene (PP), vinyl resins such as polyvinyl chloride (PVC), polyvinyl butyral (PVB), polyvinyl alcohol (PVA), polyvinylidene chloride (PVdC), polyvinyl acetate (PVAc), polyvinyl formal (PVF) or the like; polystyrenes such as polystyrene (PS), styrene-acrylonitrile copolymer (AS), ABS or the like; acrylic resins such as polymethyl methracrylate (PMMA), MMA-styrene copolymer or the like; polycarbonate (PC); cellulose resins such as ethyl cellulose (EC), cellulose acetate (CA), propyl cellulose (CP), cellulose acetate butyrate (CAB), cellulose nitrate (CN) or the like; fluorine resins such as polychlorofluoroethylene (PCTFE), polytetrafluoroethylene (PTFE), tetrafluoroethylene-hexafluoro ethylene copolymer (FEP), polyvinylidene fluoride (PVdF) or the like; urethane resins (PU); nylon resins such as type 6, type 66, type 610, type 11 or the like; and polyester resins such as polyethylene terephthalate (PET), polybutylene terephthalate (PBT), polycyclohexane terephthalate (PCT) or the like.

Furthermore, these resins can be prepared into an emulsion for a water paint. As the emulsion for a water paint, there are, for example, vinyl acetate (homo) emulsion, vinyl acetate-acrylic acid ester copolymer resin emulsion, vinyl acetate-ethylene copolymer resin emulsion (EVA emulsion), vinyl acetate-vinyl versaterton copolymer resin emulsion, vinyl acetate-polyvinyl alcohol copolymer resin emulsion, vinyl acetate-vinyl chloride copolymer resin emulsion, acrylic emulsion, acrylic silicone emulsion, styrene-acrylic copolymer resin emulsion, polystyrene emulsion, urethane emulsion, polyolefin chloride emulsion, epoxy-acrylic dispersion, SBR latex and the like.

Alternatively, the binder resin itself may have the ultraviolet absorbing properties or the infrared absorbing properties. The resin having the ultraviolet absorbing functional group may be, for example, a resin in which an ultraviolet absorber such as Tinubin is chemically bonded to the resin. An example of such the resin is, for example, Emulsion Tinubin (manufactured by Chiba Geigy).

A mark can be formed on a thermal transfer sheet or a lead film by blending the above perceiving substance and a binder and, if necessary, an additive and a solvent and using the previously known printing method, for example, gravure printing, offset printing, letterpress printing, flexographic printing, silk screen printing or the like.

A mark for identifying an authentic article which is provided at a front end of the present thermal transfer sheet can not be read in the visible light region. In addition to the invisible information, a mark detectable with the visible light may be used. For example, it is preferred that a colorant of black having the absorption band in the visible light region or a colorant of cyan/green having the absorbing properties in an red/infrared wavelength region is used, and the sensor level is set in advance so that the mark is not detected again with a sensor after sublimation, deterioration or degradation of the colorant caused by heating or another energy. As such the colorant which is sublimated, deteriorated or degraded with the heat, various dyes such as a water-soluble dye, an organic solvent-soluble dye, oil-soluble dye and the like are preferably used.

In addition, as a mark for identifying an authentic article, a resonance circuit which makes a resonance with a high-frequency wave transmitted from outside to dispatch an echo wave can be used.

A circuit (resonance circuit, LC circuit) capable of making a resonance with a high-frequency wave has a coil and a condenser, and it can make a resonance with a high-frequency wave such as electromagnetic wave and the like. The resonance circuit can be formed by laminating a metal foil on both sides of a dielectric film and forming the metal foil into a coil-like pattern with an etching process, or by printing an electrically conductive ink in a coil-like pattern on both sides of a dielectric film through various printing process. It is preferable that the resonance circuit is form by a thermal transfer process as described later. When a thermal transfer sheet is configured by providing a mark having such the resonance circuit on a thermal transfer sheet or on a lead film, the resonance circuit can be made small in the total thickness to have the flexibility, which results in no trouble upon rolling up a mark of the resonance circuit on a rolling bobbin or conveying it with a printer.

A sensor for the mark having the resonance circuit as described above has the function of transmitting an electromagnetic wave having the particular frequency to the resonance circuit, and receiving an echo wave dispatched from the resonance circuit making a resonance with the electromagnetic wave having that frequency. And, a mark having a resonance circuit is detected with the sensor and the detected reception signal is converted into a signal initiating a thermal transfer sheet to work. By using a coil which makes a resonance with the particular frequency, it can be approved that a mark of a resonance circuit having the coil is regular as being approved by a printer manufacturer.

It is preferable that a mark having a resonance circuit not only approves an the aforementioned authentic article but also is destructed by imparting the energy to the mark from a thermal transfer printer. For example, when the coil constituting a resonance circuit is entirely or partly formed of a low melting metal material such as zinc, tin, alloy and the like, the coil is melt by the heat energy applied from a thermal transfer printer, and then the coil becomes to make no resonance with an electromagnetic wave of the particular frequency.

Alternatively, a plurality of coils which make a resonance with the electromagnetic wave of several different frequencies are used and the resonance frequencies are combined to form a multichannel and, thereby, the setting of the number of usable image planes of a thermal transfer sheet can be controlled.

In addition, there is a mark containing an electrically-conductive material and having the electrically conducting properties. In this case, a mark is electrically detectable, and can be formed as an electrically-conductive layer by using, for example, an electrically-conductive ink containing a resin and a low melting metal material such as zinc, tin and the like or a metal foil made of a low melting point metal material. A mark using the aforementioned electrically-conductive material has the surface electrical resistance value of around $10^6$ to $10^9$ Ω/□, and the mark can be detected by the change in the electrical resistance value between the mark and a part adjacent thereto.

Among the aforementioned electrically-conductive materials, preferable is such one as easily destructed by applying the energy from a thermal transfer printer. For example, it is preferred that the sensor level is adjusted in advance so that the mark is not detected again with an electrical sensor after melting of the electrically-conductive material by the heat energy applied from a thermal transfer printer. As such the electrically-conductive material which is melt by the heat, specifically, a low melting metal material such as zinc, tin, alloy and the like is preferably used.

The mark having electrically-conductive properties may be provided to a front end of the thermal transfer sheet itself or on the lead film connected to a front end of the thermal transfer sheet.

In addition, there is a mark having the magnetic properties in response to a microwave. A part of a thermal transfer sheet or a lead film where a mark is not formed, that is, a part adjacent to the mark, is formed of a non-electrically-conducive material, and therefore that portion has no magnetic properties in response to a micro wave. To the contrary, a mark part contains a material having the electromagnetic properties in response to a microwave, and therefore the mark part has the magnetic properties in response to a microwave.

However among the aforementioned materials having the electromagnetic properties in response to a microwave, preferable is such one as easily destructed by applying the energy from a thermal transfer printer. For example, it is preferred that the sensor level of the sensor for exclusive use is adjusted in advance so that the mark is not detected again after melting of the material having the electromagnetic properties caused by the heat energy applied from a thermal transfer printer. As such the material having the electromagnetic properties in response to a microwave which is melt by the heat, more specifically, an electrically-conductive metal material having a low melting point such as zinc, tin, alloy and the like is preferably used.

The mark having the electromagnetic properties in response to a microwave can be formed by thinly plating with a gaseous metal through a vacuum disposition method, a sputtering method, a low temperature plasma method and the like, or by coating a coating solution containing an electrically-conductive material through the known coating method.

When a thermal transfer sheet having a mark having the electromagnetic properties in response to a microwave is scanned with a microwave, since the specific dielectric constant $\epsilon$, the permeability $\mu$ and the resistivity $\rho$ are different between a non-electrically-conductive material and an electrically-conductive material, and a change is generated in a responsive microwave flux, that is, a reflection flux or a permeability flux, then this change can be detected to read that a thermal transfer sheet is an authentic article.

In addition, there is a mark having the magnetic properties.

The mark having the magnetic properties may be composed of magnetic powders and a resin binder. The magnetic powders may be hard magnetic or soft magnetic powders if they are ferromagnetic powders. As the hard magnetic powders, there are, for example, magnetic powders such as $\gamma$-$Fe_2O_3$, Co adhered $\gamma$-$Fe_2O_3$, $Fe_3O_4$, Fe, Fe—Cr, Fe—Co, Co—Cr, Co—Ni, Ba ferrite, Sr ferrite, $CrO_2$ and the like.

Examples of the soft magnetic powders are a magnetic alloy material comprising Al, Si, Fe or the like, a metal high magnetic permeability material such as Permalloy, Sendust, Fe and the like, a ferrite such as Mn—Zn ferrite, Co—Zn ferrite, Ni—Zn ferrite and the like, magnetic powders of metal amorphous material and the like.

As a resin binder (or ink vehicle) in which the above magnetic powders are dispersed, butyral resin, vinyl chloride/vinyl acetate copolymer resin, urethane resin, polyester resin, cellulose resin, acrylic resin, styrene/maleic acid copolymer resin and the like may be used. If necessary, a rubber resin such as nitrile rubber and the like or urethane elastomer and the like are added thereto. Alternatively, taking the heat resistance into consideration, a resin having a high glass transition point (Tg) such as polyamide, polyimide, polyether sulfone and the like, or the resin system in which Tg is raised by the curing reaction can be used. As necessary, a surfactant, a silane coupling agent, a plasticizer, a wax, a silicone oil, a pigment such as carbon and the like may be added to a dispersion comprising the above resin or ink vehicle and the magnetic powders dispersed therein.

The mark of a magnetic coating layer is formed by preparing a magnetic coating material containing the aforementioned magnetic powders and the resin binder, coating it on a thermal transfer sheet or a lead film, and then drying the same. The various known coating methods such as silk screen printing method, gravure method, roll method, knife edge method and the like are used.

For reading the magnetic pattern, a magnetic head wound with two coils is usually used. The constant current is flown through one of the magnetic coils of the magnetic head, and the induced current or voltage induced when the magnetic head scans the magnetic pattern is detected by the other coil. The induced current is produced depending upon the change in magnetic flux of the magnetic head.

In addition, mention may be made of the mark containing an electrically-conductive material and, thus having the electrical conductivity. In this case, the mark can be detected electrically. For example, the mark as an electrically-conductive layer can be formed from an electrically-conductive ink containing a resin and metal powders or carbon, or from a metal foil. The mark using the above electrically-conductive material has the surface electric resistance of around $10^6$ to $10^9$ Ω/□, and the mark can be detected by the change in the electric resistance value between the mark and a part adjacent to the mark.

The mark having the electrical conductivity may be provided at a front end of a thermal transfer sheet itself or on a lead film connected to a front end of the thermal transfer sheet. If an ink used in a thermally transferable layer of the thermal transfer sheet has the electrical conductivity, the same ink can be used in order to form the mark having the electrical conductivity at the front end the thermal transfer sheet.

Furthermore, the mark can be provided on the entire side of the thermal transfer sheet in a solid manner. In this case, for example, when the ink used in the thermally transferable layer is electrically conductive, the thermally transferable layer may serve as the mark. When the ink used in a rear layer is electrically conductive, the rear layer may also serve as the mark.

The aforementioned visible or invisible mark for identifying an authentic article may be a mark having the particular optical properties in an ultraviolet ray region or an infrared ray region, or a mark having the electrical conductivity, a mark having the electromagnetic properties in response to a microwave and the like. In any cases, a pattern of the visible or invisible mark can take any shape, for example, line, bar code, letter, circle, ellipse, triangle, square, polygon, or trade mark, or a combination of two or more of them. The shape of the pattern-like mark may be arbitrarily selected depending upon a sensor which reads the mark.

The dimension such as inner diameter, external diameter, length and the like of a bobbin, whether for supply or for rolling up, which is used in a thermal transfer sheet of the present invention can be appropriately selected depending upon a cassette in which a thermal transfer sheet is mounted, a thermal transfer printer and the like. In addition, as a material constituting a bobbin, there can be used the materials which have been used for the previous bobbins such as a paper, a plastic, a paper impregnated with a resin and the like.

The fixing of a thermal transfer sheet or a lead film to the bobbin can be performed by using an arbitrary material such as double-coated tape, pressure-sensitive adhesive, and the like.

The thermal transfer sheet of the present invention is not limited to the aforementioned embodiments but can be composed of various thermal transfer sheets in a range without departing the present invention.

Thermal Transfer Recording Method and Recording System

The aforementioned thermal transfer sheet is used in a thermal transfer recording method and recording system of the present invention. In the process of the thermal transfer recording method and recording system, a mark for identifying that the thermal transfer sheet is an authentic article is provided for the thermal transfer sheet in advance, preferably at a front end of the thermal transfer sheet. The mark is detected with a determinator of the thermal transfer sheet and, when the determinator determines that the mark is correct for the printer, the printer is interlocked with the determinator to be worked in the state where the thermal transfer sheet is set thereon. After detection of the mark, the energy is applied to the mark from a destructor to destruct the mark and, as a result, the mark can not be detected again.

Figure 3:
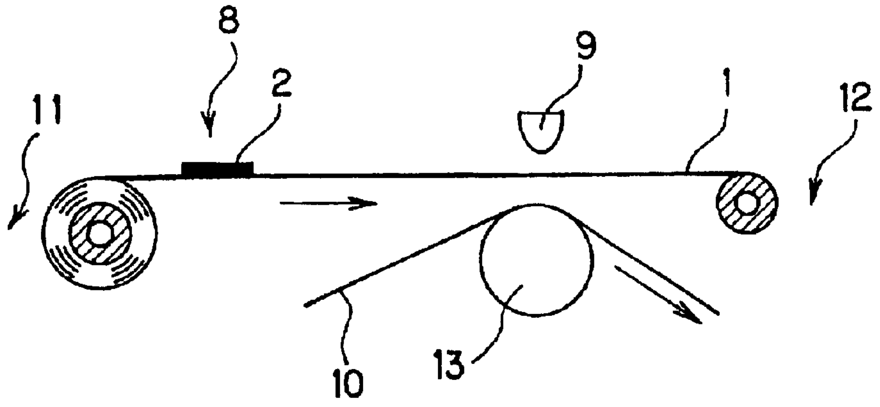
FIG. 3 is an illustration explaining processes of a thermal transfer recording method of the present invention.
Figure 3:
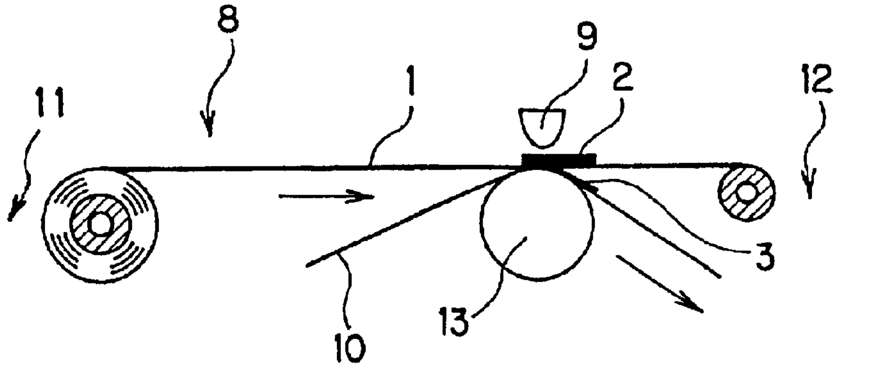
Figure 3:
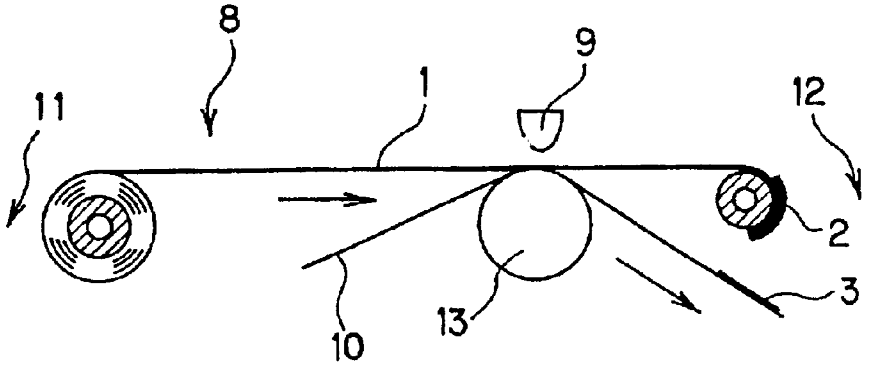
Figure 4:
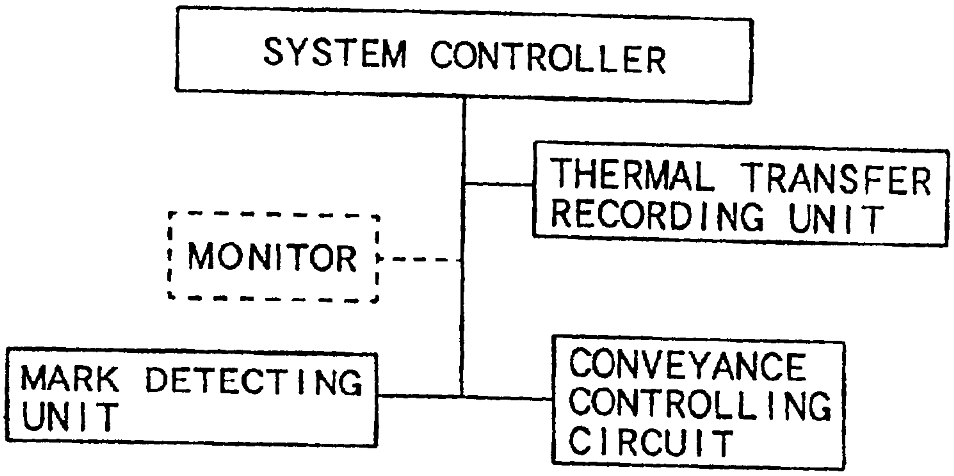
FIG. 4 is a block diagram showing one embodiment of the electrical construction of a thermal transfer printer using a thermal transfer recording method of the present invention.

For example, in the thermal transfer method and system of the present invention, as shown in FIGS. 3 and 4, when a thermal transfer sheet 1 which received an approval of the quality assurance for use in a thermal transfer printer is set on the printer, a mark detecting unit (sensor) detects a mark 2 for identifying an authentic article which is provided at a front end of the thermal transfer sheet 1 (FIG. 3 (1)).

As a mark for identifying an authentic article, there may be used a mark having an optical property in the visible region, a mark having an optical property in the in the ultraviolet ray region or the infrared ray region, a mark having the electrical properties, a mark having the electromagnetic properties in response to the micro wave, or a mark having the resonance properties in response to a high-frequency wave of the particular frequency. The mark detection unit detects the properties of the mark itself, or a difference in the properties between the mark itself and a part adjacent thereto, and then determine the truth of the mark. The mark detection level is adjusted in advance by taking the variability of the detected values for the mark and the misoperation into a consideration, and the adjusted level is memorized in a system controller.

Then, a detection level of a mark 2 detected with the aforementioned mark detection unit is compared with the mark detection level memorized in a system controller and, when the level detected with the mark detecting unit is equal to or above the mark detection level memorized in the system controller, it is determined that a thermal transfer sheet 1 having the mark 2 is an authentic article.

Alternatively, when a mark 2 can contain an inherent information such as a bar code and the like, an information such as the number of recordable image planes (usable number and the like) of the thermal transfer sheet 1 can be recorded as an inherent information. The information of the number of image planes is read with a mark detecting unit, and the information of the number of the image planes can be memorized in a system controller of the printer.

And, after the thermal transfer sheet 1 is determined to be an authentic article, a conveyance controlling circuit issues a command to convey a thermal transfer sheet 1 from a supply side 11 to a thermal transfer recording unit 9 and a discharge side 12.

Then, before a mark for identifying an authentic article reaches a thermal transfer recording unit 9, a system controller sends a command to a thermal transfer recording unit 9 to print a solid print. On the other hand, the thermal transfer sheet 1 is carried at a position of the recording unit 9 to be laid on a recording paper 10, and the thermal transfer sheet 1 and the recording paper 10 are held between a thermal transfer recording unit 9 and platen roller 13. In this condition, the thermal transfer recording unit 9 receiving the aforesaid command heats a portion imparted with a mark 2 of the thermal transfer sheet 1 to transfer a thermally transferable layer 3 of a thermal transfer sheet 1 to a recording paper 10. (FIG. 3 (2)).

As the result, the mark 2 is destructed, and it can not be detected again. In addition, the mark 2 is provided on a rear side of a thermal transfer sheet, and is situated at a position to overlap with a thermally transferable layer 3 on a face side. Therefore, printing is performed on a recording paper 10 at the same time with the mark destruction, which results in the confirmation of the mark destruction.

As the thermal transfer recording unit (recording part) 9 of a thermal transfer printer, a thermal head and a laser heating system can be used. In addition to the heat from a recording part of a thermal transfer printer, a heating unit such as a light irradiating unit, a heater and the like which can apply the energy to a mark 2 can be mounted between the sensor 8 and the recording part 9.

When the heat energy is applied to the mark from a thermal transfer printer, the mark is molten and destructed by heating at around 200° C. by means of the thermal head, and thus it becomes undetectable with a sensor. In this case, though the heat above a melting point of a mark material is applied to melt the mark material, heating temperature of the thermal head must be restricted within a printing condition.

Like this, the utilization of the heat from a recording unit of a thermal transfer printer as the energy for destructing a mark is preferably performed. Although as the energy applying means for destructing the mark, a heating unit such as a light irradiating unit, a heater and the like may be used, the use of the recording unit of a thermal transfer printer as an energy applying means for destructing a mark can simplify the structure of a printer, thus becoming excellent in operations and cost performance of the printer.

Then, after a thermal transfer sheet 1 including a mark part 2 is heated, a conveyance controlling circuit issues a command to convey a thermal transfer sheet 1 and a recording paper 10 from a supply side 11 to a discharge side 12 (a direction of an arrow in the figure) to initiate printing regularly (FIG. 3 (3)).

Then, the thermal recording is continued. In some cases, the thermal recording is continued until the number of the image planes memorized in a system controller. However, when the recording is performed exceeding the number of the image planes memorized in a system controller, some massage such as "Exchange a thermal transfer sheet" is displayed on a monitor, or a thermal transfer printer is stopped.

Even when a thermal transfer sheet which did not receive an approval of the quality assurance for use in the printer, that is, a pitated thermal transfer sheet, is set on a thermal transfer printer, an operation of a mark detecting unit is also performed at a front part of the thermal transfer sheet. However, since a mark for exclusive use is not present, a detection level of the mark does not reach a level memorized in a system controller.

Therefore, it is determined that the thermal transfer sheet is not an authentic article, a conveyance controlling circuit dose not issue a command to convey the thermal transfer sheet from a supply side, and a thermal transfer printer remains stopped. Alternatively, "Exchange a thermal transfer sheet with an authentic article" is displayed on a monitor in some cases.

The thermal transfer recording method and recording system of the present invention as described above are not limited to the above embodiments and the mark detection, and the energy applying means for destructing a mark can be used in various thermal transfer printers in a range without departing the present invention.

As described above, according to the thermal transfer recording sheet, the thermal transfer recording method, and the thermal transfer recording system of the present invention, an approval information which is approved as applicable to the predetermined printer is formed in a format of an approval mark or other appropriate form, and imparted to a thermal transfer sheet. Then, such a thermal transfer sheet is set on the corresponding printer and, only when a determinator determines that an approval information is correct for the printer, a printer is interlocked with the determinator to be worked in the state where the thermal transfer sheet is set thereon.

Therefore, according to the present invention, since a printer can be regulated so as to limit the use to thermal transfer sheets which received an approval of the quality assurance by a printer manufacturer or the like, the proper printing can be performed and, as a result, the deterioration of the printing quality and the deterioration of a thermal head can be prevented.

In addition, in a preferable aspect of the present invention, the mark is formed of a material which can be destructed by the energy apply from the outside, for example, the heat from a recording part. Then, a thermal transfer sheet having such the destructible approval mark is set on a printer and, only when a determinator determines that the approval mark is correct for a printer, the printer and a destructor are interlocked with the determinator to work the printer in the state where the thermal transfer sheet is set thereon and, at the same time, the destructor applies the energy to the mark to destruct the mark.

In this embodiment, at a time when a printer permits a thermal transfer sheet, an approval mark of the thermal transfer sheet is destructed, it can be no longer detected to be correct. Therefore, according to this embodiment, not only a printer can be regulated so as to limit the use to thermal transfer sheets which received an approval but also the reuse and the misuse by replacing a mark for identifying an authentic article with a different mark for an another sheet or applying the mark on an incorrect thermal transfer sheet can be prevented.

Then, a resonance circuit and a process for manufacturing the same for accomplishing the second object of the present invention will be explained.

Figure 5:
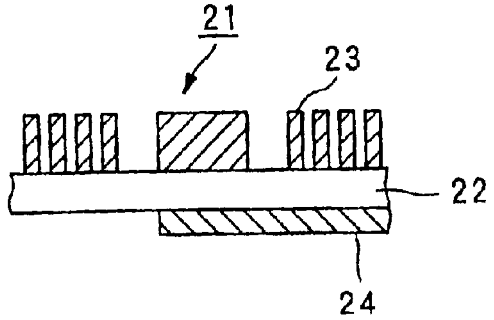
FIG. 5 is a cross-sectional view showing one embodiment of a resonance circuit of the present invention; and, FIG. 6 is a plane view of the front and the rear surfaces showing one embodiment of a resonance circuit of the present invention.

In one embodiment, as shown in FIG. 5, a resonance circuit 21 of the present invention is composed of a coil-like circuit 23 provided on one side of a dielectric material 22, and a condenser electrode circuit 24 provided on the other side of a dielectric material. The coil-like circuit 23 and the condenser electrode circuit 24 are formed by using a thermal transfer sheet having a thermally transferable electrically-conductive layer (electrically-conductive layer transfer sheet), and then thermally transferring the electrically-conductive layer on the dielectric material in the pattern.

Figure 6:
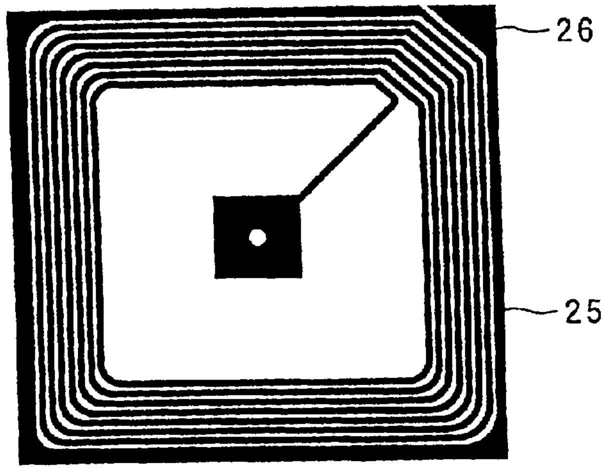
Figure 6:
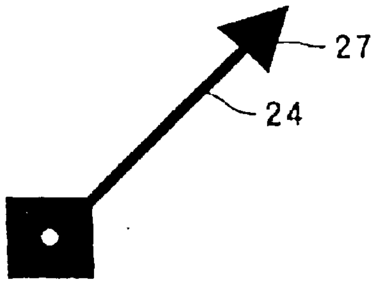

In the resonance circuit 21, a R, L circuit pattern 25 is formed on one side of a dielectric material 22 as shown in FIG. 6 (1). R is resistance of a part of a transferred electrically-conductive ink which forms a circuit and L is inductance which denotes a coil-like circuit.

In the resonance circuit 21, a condenser electrode circuit 24 is formed on the other side of the dielectric material 22 as shown in FIG. 6 (2). And, although not shown, a pore is provided in advance at a position where a circuit on the face and that on the back are overlapped in order to connect the circuits formed on both sides of the dielectric material to electrically conduct the circuits on the face and rear sides, and respective electrically conducting terminal 26 and 27 on the face and rear sides can be electrically connected shortly.

Dielectric Material

As a dielectric material 22 in the resonance circuit of the present invention, various plastic films can be used and, for example, plastic films such as polyethylene, polypropylene, polystyrene, polyester and the like can be used as a support.

It is preferred that a pore or a notch is provided in advance at a position where the circuits on the face and rear sides are overlapped in order to connect the circuits formed on both sides and make the circuits on the face and rear sides to be easily electrically conducted.

In addition, it is preferred that the dielectric material undergoes the treatment for easy adhesion such as corona treatment, plasma treatment, primer treatment and the like in order to make adhesion easy upon the formation of a circuit on the face and back surfaces by the thermal transfer process.

Coil-like Circuit and Condenser Electrode Circuit

In the present invention for the second object, a coil-like circuit 23 and a condenser electrode circuit 24 are formed by using a thermal transfer sheet having a transferable electrically-conductive layer and by thermally transferring the electrically-conductive layer on a dielectric material in the predetermined pattern.

As a thermal transfer sheet having a transferable electrically-conductive layer, there is a sheet in which a metal deposition layer as a transferable thermally-conductive layer is provided on a substrate via a peeling layer which aids releasing of the thermally-conductive layer from the substrate of the thermally-conductive layer transfer sheet. The transferable thermally-conductive layer made of such a metal deposition layer can be transferred by heating with the use of the thermal head. Alternatively, there is a sheet in which a photo-thermal converting layer containing as a main component a near infrared absorbing material and a binder resin and a transferable electrically-conductive ink layer containing a binder resin are laminated on a substrate in this order. When the transferable electrically-conductive ink layer containing a binder resin is laid on the photo-thermal converting layer, it can be transferred by the laser irradiation.

First, a thermal transfer sheet in which a metal deposition layer is provided on a substrate via a peeling layer is explained.

As a substrate used for a thermal transfer sheet (electrically-conductive layer transfer sheet), the same substrates as those used for the previous thermal transfer sheets can be used as they are, and other substrates can be also used, being not limiting.

As the particular examples of the preferable substrates, there are plastic films such as polyester, polypropylene, cellophane, polycarbonate, cellulose acetate, polyethylene, polyvinyl chloride, polystyrene, nylon, polyimide, polyvinylidene chloride, polyvinyl alcohol, fluorine resin, chlorinated rubber, ionomer and the like; papers such as condenser paper, paraffin paper and the like; or a composite derived from any of them may be used.

Although the thickness of this substrate can be appropriately varied depending upon materials so that its strength and heat conductivity become suitable, around 2 to 12 $\mu$m is preferable from the relationship with the printing (recording) sensitivity. That is, when the thickness is less than 2 $\mu$m, the strength as a substrate is lacked whereas when the thickness exceeds 12 $\mu$m, the heat upon printing (recording) becomes difficult to be conducted towards the outermost layer.

A peeling layer is a layer, a whole in the thickness direction (depth direction) of which, or due to cohesive failure, a part of which is transferred to a dielectric side from a thermal transfer sheet upon thermal transfer to form the mostsuperficial surface of a recorded product. In another word, a peeling layer is layer which prevents a thermal transfer sheet and a dielectric material from fusing when they are heated with a thermal head or the like, and makes a thermal transfer sheet to be easily peeled from a dielectric material, which leads to the better transfer recording. In addition, a peeling layer can impart the resistance to scuffing and the resistance to solvent to a circuit after transferring.

The peeling layer is interposed between the substrate and the transferable thermally-conductive layer in order to prevent the substrate and dielectric material from fusing when the thermal transfer sheet is laid on the dielectric material and heated with a thermal head or the like. The peeling layer may be formed of a resin having Tg or a softening point of not lower than 100° C., more specifically, a polymethyl methacrylate resin (Tg 105° C.), a cellulose acetate (softening point 235° C.) or the like. In addition, the resistance to scuffing of the transferred circuit can be improved by incorporating the peeling layer with a wax having a melting point of 70 to 130° C. at an amount in a range of 0 to 20% by weight, preferably around 5% by weight relative to an amount the resin.

It is better that the thickness of this peeling layer is as thin as possible in order not to decrease the printing (recording) sensitivity of a thermal transfer sheet. An amount to be coated is preferably around 0.1 to 0.7 g/m$^2$ in the dry state. A peeling layer can be obtained by coating with the known gravure printing method, screen printing method, reverse roll coating method using a gravure form plate and the like and drying.

A metal deposition layer is a metal thin layer formed of a metal such as alminium, zinc, tin, chromium, gold, silver and the like, or an alloy such as brass with a metallizing method under vacuum such as vacuum deposition, sputering and the like, that is, physical vapor deposition (PVD). The thickness of a material deposition layer is usually around 0.05 to 1 $\mu$m.

An adhesive layer can be formed on a metal deposition layer to impart the metal deposition layer with the adhering properties to the dielectric material. The adhesive layer can be formed from the known thermoplastic resin.

The adhesive layer can be obtained by coating the a material or composition for the adhesive layer through the known gravure printing method, screen printing method, reverse roll coating method using a gravure form plate and drying. An amount of an adhesive layer to be coated is preferably around 0.5 to 1.0 g/m$^2$ in the dry state. When an amount to be coated is less than 0.5 g/m$^2$, the sufficient adhering force can not be obtained whereas when it exceeds 1.0 g/m$^2$, the sharpness of edge portion of the printed image and the printing (recording) sensitivity are deteriorated, being not preferable.

In addition, a rear layer can be provided on the other side of a thermal transfer sheet.

A rear layer is formed in order to improve the slipping property between a thermal transfer sheet and a thermal head and prevent the sticking, and has the good slipping property at a high temperature. This rear layer is fundamentally composed of resin having the heat resistance, a substance which serves as a release agent working at a high temperature (thermal release agent) or a slipping agent, for example, a surfactant, an inorganic particle, an organic particle, a pigment and the like. By provision of such the rear layer, a resin film which is relatively weak to the heat can be used as a substrate.

A rear layer can be formed by blending the heat resistant resin and a substance which serves as the thermal release agent or the slipping agent, dissolving or dispersing them in a solvent to prepare a coating solution, and coating this coating solution through the common coating means such as gravure coater, roll coater, wire bar and the like, followed by drying.

The thermal transfer sheet provided with the metal deposition layer is not limited to the above embodiment but it can be appropriately varied by application. For example, a metal deposition layer can be formed according to the same manner as that for a transferable electrically-conductive ink layer containing a binder described below.

Then, a thermal transfer sheet in which a photo-thermal converting layer containing as a main component a near infrared absorbing material and a binder resin and a transferable electrically-conductive ink layer are laminated in this order on a substrate is explained.

As a substrate for a thermal transfer sheet in which a photo-thermal converting layer and a transferable electrically-conductive ink layer are laminated in this order, the same substrates as those used for the previous thermal transfer recording materials can be used as they are, and other substrates can be used, being not limiting. It is preferred to use a substrate having the high transparency when the laser light is irradiated from a thermal transfer sheet side (from the rear surface), and it is particularly preferable that the transmittance of the wavelength of the laser light to be used is not less than 60%.

Although the thickness of this substrate can be appropriately varied depending upon materials so that its strength and the heat conductivity become suitable, the thickness is preferably, for example, 2 to 180 $\mu$m. When an adsorbing drum is used as a material holding means, the thickness is preferably 50 to 125 $\mu$m because the sufficient printing pressure can be obtained.

Photo-Thermal Converting Layer

A photo-thermal converting layer is a layer which is provided on a substrate and converts the laser light irradiated to a thermal transfer sheet for recording into the heat. The photo-thermal converting layer is composed mainly of a near infrared absorbing material such as a metal oxide pigment and a binder resin.

The metal oxide pigment of the near infrared absorbing material is a substance which absorbs the light and converts it effectively into the heat. For example, when a semiconductor laser is used as a light source, substances having the absorption maximum at the wavelength band of 750 to 890 nm are preferable in order to lead an efficient heating. Specific examples of the metal oxide pigment includes titanium black, black iron oxide ($Fe_3O_4$), composite oxide ($CuO—Cr_2O_3$, $CuO—Fe_2O_3—Mn_2O_3$, $CuO—Fe_2O_3—Cr_2O_3$) and the like. Two or more of these metal oxide pigments may be mixed.

In addition, as the metal oxide pigment of a near infrared absorbing material, a composite metal oxide such as ilmenite which is a composite oxide of iron and titanium and composite oxide of iron and copper can be used.

In addition, as a binder resin for a photo-thermal converting layer, resins having a high glass transition point and the high thermal conductivity is used, and common heat-resistant resins such as polymethyl methacrylate, polycarbonate, polystyrene, ethyl cellulose, nitrocellulose, polyvinyl alcohol, polyvinyl acetal, polyvinyl butyral, polyvinyl formal, polyester, chlorinated polypropylene, chlorinated polyethylene, polyvinyl chloride, polyamide, polyimide, polyetherimide, polysulfone, polyethersulfone, aramide and the like can be used as such a binder resin.

In addition, as a binder in a photo-thermal converting layer, a water-soluble polymer can be also used. The water-soluble polymer is preferable in the release property from a thermally transferable ink layer, the heat-resistance upon the light irradiation, and the low level of the flying or scattering amount upon a severe heating. When the water-soluble polymer is used, it is desirable that a photo-thermal converting substance is modified by introducing a hydrophilic group such as a sulfone group to be water-soluble or is dispersed into an aqueous system.

In addition, the release property between a photo-thermal converting layer and a thermally transferable ink layer can be improved and the sensitivity can be enhanced by adding various release agents to a photo-thermal converting layer. As a release agent, a silicone release agent such as polyoxyalkylene-modified silicone oil, alcohol-modified silicone oil and the like; a fluorine surfactant such as perfluorophosphate ester surfactant; and other various surfactants are effective.

A photo-thermal converting layer can be formed by blending the aforementioned near infrared absorbing material and a binder resin and, if necessary, a solvent component such as water, organic solvent and the like to prepare a coating solution for forming a photo-thermal converting layer, coating it through the known gravure direct coating, gravure reverse coating, knife coating, air coating, roll coating or the like, and then drying.

The thickness of a photo-thermal converting layer is preferably between 0.1 to 3 $\mu$m in the dried state, and the content of a near infrared absorbing material in a photo-thermal converting layer can be usually decided such that the abosorbance at the wavelength of the light source used for image recording is 0.3 to 3.0. Generally, around 0.4 to 1.5 of such a absorbance causes a good result.

Transferable Electrically-Conductive Layer

A transferable electrically-conductive layer is composed mainly of a electrically-conductive material and a binder resin.

As the electrically-conductive material, there may be used powders of a metal such as gold, silver, copper, iron and the like, various alloys, and carbon black and the like. These electrically-conductive material powders can be used as spherical powders or plate-like powders.

The content of a metal material in a transferable electrically-conductive ink layer is not limited to specified range but usually in a range of 10 to 70% by weight.

A binder in a transferable electrically-conductive layer can be composed of a resin and a wax. As a resin, more specifically, there are acrylic resin, cellulose resin, melamine resin, polyester resin, polyamide resin, polyolefin resin, acrylic resin, styrene resin, polyamide, ethylene-vinyl acetate copolymer, vinyl chloride-vinyl acetate copolymer, thermoplastic elastomers such as styrene-butadiene rubber and the like. In particular, the binders which have hitherto been used as a heat-sensitive adhesive agent having a relatively low softening point, for example, of 50 to 150° C. are preferable.

As a wax component, there are microcrystalline wax, carnauba wax, paraffin wax and the like. Furthermore, there are various waxes such as Fischer-Tropsch wax, various low-molecular polyethylenes, Japan tallow, bees wax, spermaceti, insect wax, wool wax, shellac wax, candelilla wax, petrolatum, polyester wax, partially modified wax, fatty acid ester, fatty acid amide and the like. Among these, waxes having a melting point of 50 to 85° C. are preferable.

A transferable electrically-conductive layer can be formed by blending the aforementioned metal material and a binder component and, if necessary, various additives such as dispersing agent, antistatic agent and the like and, if necessary, a solvent component such as water, organic solvent and the like to prepare a coating solution for forming a transferable electrically-conductive layer, coating it through the known hot melt coating, hot lacquer coating, gravure direct coating, gravure reverse coating, knife coating, air coating, roll coating or the like. The thickness of the transferable electrically-conductive layer is usually in a range of around 1 to 8 $\mu$m in the dry state.

In the aforementioned laser-type thermal transfer sheet, when the adhesive property between a substrate and a photo-thermal converting layer is weak, a primer layer can be provided between a substrate and a photo-thermal converting layer to strengthen the adhesion between the photo-thermal converting layer and the substrate.

As a resin used for a primer layer, there may be used alkyd resin, polyester resin, polyvinyl acetate resin, vinyl chloride-vinyl acetate copolymer resin, NBR resin, SBR resin, polyurethane resin, acrylic resin, polyamide resin and the like, mixtures of these resins, and a modified resin of these. "A modified resin" refers to, for example, a resin obtained by copolymerizing or grafting a base resin with a monomer containing hydroxyl, carboxyl or a monomer comprising quaternary ammonium salt in order to increase the adhesive property or the hydrophilic property.

In order to improve the adhesive property or the strength of the primer layer, the aforementioned resin may be cross-linked with various cross-linking agents such as epoxy resin, melamine resin, isocyanate or the like.

A primer layer may be formed according to the same manner as that for the aforementioned photo-thermal converting layer, and the thickness of a primer layer is usually around 0.01 to 10 μm in the dry state.

In a laser-type thermal transfer sheet, a cushion layer can be provided between a substrate and a photo-thermal converting layer, and the cushion layer improves the extent of contact between a thermal transfer sheet and a dielectric material which is a receiving material upon printing with the laser light irradiation.

In order to impart this cushion layer, a material having the low elasticity or a material having the rubber elasticity may be used.

In addition, in a laser-type thermal transfer sheet, a peeling layer can be formed between a photo-thermal converting layer and a transferable electrically-conductive layer so that the transferable electrically-conductive layer is easily peeled from the photo-thermal converting layer and transferred by the laser light irradiation.

A peeling layer may be composed of a wax alone but it is usually preferable that it is composed of a wax and/or a binder resin of a thermoplastic resin. A wax having 50 to 100° C. of melting point or softening point can be used, and examples of the usable wax include: natural waxes such as bees wax, spermaceti, Japan tallow, rice bran wax, carnauba wax, candelilla wax, montan wax; synthetic waxes such as paraffin wax, microcrystalline wax, oxidation wax, ozokerite wax, ceresin wax, ester wax, polyethylene wax and the like; higher saturated fatty acid such as margaric acid, lauric acid, myristic acid, palmitic acid, stearic acid, furoin acid, behenic acid and the like; higher saturated monovalent alcohol such as stearyl alcohol, behenyl alcohol and the like; higher ester such as fatty acid ester of sorbitan and the like; higher fatty acid amide such as staric acid amide, oleic acid amide and the like.

As a thermoplastic resin in a peeling layer, there may be used ethylene copolymer such as ethylene-vinyl acetate resin and the like; polyamide resin; polyester resin; polyurethane resin; polyolefin resin; acrylic resin; cellulose resin; vinyl chloride resin; rosin resin; petroleum resin; ionomer resin; elastomers such as natural rubber, styrene-butadiene rubber, isoprene rubber, chloroprene rubber and the like; ester gum; rosin derivatives such as rosin maleic acid resin, rosin phenol resin, hydrogenated rosin and the like; phenol resin; terpene resin; cyclopentanediene resin; aromatic resin; and the like.

A coating solution for forming the peeling layer is prepared by blending the aforementioned wax and thermoplastic resin, and if necessary, peeling agent, for example, higher fatty acid, higher alcohol, higher fatty acid ester, amides, higher amine, silicone oil, solid waxes such as polyethylene wax, surfactants such as fluorine compound and phosphoric ester. Then the peeling layer can be formed by coating such a coating solution through the conventionally known hot-melt coating, hot lacquer coating, gravure direct coating, gravure reverse coating, knife coating, air coating, roll coating or the like. The thickness of the peeling layer is usually around 0.1 to 4 μm in the dry state.

When the thickness of the peeling layer is less than 0.1 μm, the better release effects can not be obtained. On the other hand, when the thickness exceeds 4 μm, the transfer sensitivity upon printing is lowered, being not preferable.

Adhesive Layer

In addition, in a laser-type thermal transfer sheet, the adhesive property between the dielectric material and the transferable electrically-conductive layer to be transferred can be improved by forming an adhesive layer on a transferable electrically-conductive layer.

An adhesive layer can be mainly composed of substances which can be softened and exerts the adhesive property by heating with a laser light irradiation. Examples of such a substance include a thermoplastic resin, waxes, amide, ester and salt of higher fatty acid. Further, anti-blocking agent such as fluorine resin and powders of a inorganic compound can be contained therein.

As a thermoplastic resin, for example, there are ethylene-vinyl acetate copolymer, ethylene-acrylic acid ester copolymer, polyester resin, polyethylene, polystyrene, polypropylene, polybutene, petroleum resin, vinyl chloride resin, vinyl chloride-vinyl acetate copolymer, vinylidene chloride resin, methacrylic resin, polyamide, polycarbonate, polyvinyl formal, polyvinyl butyral, polyvinyl acetate, polyisobutylene, polyacetal. Example thereof further includes elastomers such as natural rubber, acrylate rubber, butyl rubber, nitrile rubber, butadiene rubber, isoprene rubber, styrene-butadiene rubber, chloroprene rubber, urethane rubber, silicone rubber, acrylic rubber, fluorine rubber, neoprene rubber, chlorosulfonated polyethylene, epichlorohydrin, ethylene-propylene-diene rubber, urethane elastomer and the like. In particular, the thermoplastic resins which have hitherto been used as a heat-sensitive adhesive having a softening point of 50 to 150° C. are preferable.

The adhesive layer can be formed by blending the aforementioned material and additives to prepare a coating composition for a hot metal coating, or if necessary, by dissolving or dispersing the aforementioned material and additives in a suitable organic solvent or water to prepare a coating solution for forming an adhesive layer, then coating it through the known method such as hot melt coating, hot lacquer coating, gravure direct coating, gravure reverse coating, knife coating, air coating, roll coating or the like. The thickness of the adhesive layer is usually 0.1 to 5 μm in the dry state. When the thickness of the adhesive layer is less than 0.1 μm, the adhesive property between a dielectric material and a transferable electrically-conductive layer may be inferior, which leads to the deterioration of transfer upon printing. On the other hand, when the thickness exceeds 5 μm, the transfer sensitivity upon printing may be lowered and the sufficient printing quality can not be obtained.

Rear Layer

In addition, a laser-type thermal transfer sheet may be provided with a rear layer opposite to the side of a substrate on which a photo-thermal converting layer and a transferable electrically-conductive layer are provided, if necessary. A rear layer can be provided as a slipping layer for improving the mechanical conveying property of a thermal transfer sheet and preventing the curl of a thermal transfer sheet, as an antistatic layer for preventing the electrification, or as an anti-block layer.

Slipping Layer

A laser-type thermal transfer sheet can be provided with a slipping layer opposite to the side of a substrate on which a photo-thermal converting layer and a transferable electrically-conductive layer are provided in order to improve the conveying property of the thermal transfer sheet or prevent the curl of the thermal transfer sheet. As a slipping layer having such the function, there may be used a layer formed by incorporating an acrylic resin such as acrylic polyol with an organic filler such as fluorine resin, polyamide resin or the like.

As the acrylic polyol, there are polymers obtained from polymerization of ethylene glycol methacrylate or propylene glycol methacrylate. In addition, acrylic polyols in which an ethylene glycol part is trimethylene glycol, butanediol, pentanediol, hexanediol, cyclopentanediol, cyclohexanediol, glycerin or the like can be used. These acrylic polyols not only contribute to prevention of the curl but also easily hold additives such as an organic or inorganic filler and have the good adhesive property with a substrate.

Alternatively, a slipping layer obtained by curing acrylic polyol with a curing agent can be used. The known curing agents can be used and, among these, isocyanate compounds are preferable. Acrylic polyols reacts with an isocyanate compound to form an urethane linkage, and it becomes hardened with three dimensional structure. This reaction improves the slipping layer in the heat-resistant storage property, the anti-solvent property, and the adhesive property with a substrate. It is preferred that an amount of a curing agent to be added is 1 to 2 equivalents relative to 1 reactive group equivalent of a resin.

Furthermore, it is preferred that an organic filler is added to the aforementioned slipping layer. The conveying property of thermal transfer sheet in the interior of a laser printer is improved by the function of this filler, and the storing property of thermal transfer sheet is also improved by preventing the blocking and the like. As an organic filler, there are acrylic filler, polyamide filler, fluorine filler and polyethylene wax.

The slipping layer is formed by arbitrarily mixing the aforementioned resin and an organic filler, if necessary, further blending with a solvent and a diluent sufficiently to prepare coating solution, coating it on the other side of a substrate through the same method as in formation of the transferable layer, for example, gravure printing method, screen printing method, reverse roll coating using a gravure form plate or the like, and then drying. The thickness of the slipping layer is usually around 0.01 to 3.0 μm.

Antistatic Layer

In order to prevent the staining of a laser-type thermal transfer sheet with a dust or impart the conveying stability in a printer, an antistatic layer containing the following antistatic agent can be provided on the rear surface of a thermal transfer sheet.

As an antistatic agent, any of the known cationic, anioic, amphoteric and nonionic antistatic agents can be used. For example, there are cationic antistatic agents such as quaternary ammonium salt, polyamine derivative and the like, anionic antistatic agents such as alkyl phosphate, nonionic antistatic agents such as fatty acid ester.

The slipping agent such as organic or inorganic filler may be added to the antistatic agent.

The antistatic layer can be formed by blending the aforementioned antistatic agent with additives such as organic or inorganic filler as required, dissolving or dispersing them in a solvent to obtain a coating solution, coating it through the known method, that is, gravure coating, gravure reverse coating, roll coating or the like, and then drying. The thickness of the antistatic layer is usually around 0.001 to 0.1 μm.

Anti-blocking Layer

An anti-blocking layer is mainly composed of a particle and a binder resin. As the particle material, inorganic particles such as silica, calcium carbonate, clay and the like, and organic particles such as MMA, styrene, benzoguanamine and the like are used. The particle size is usually 1.0 to 50 μm, preferably 5 to 30 μm.

As a binder resin, the thermoplastic resins described above may be used, and those having a Tg of not lower than 50° C. are preferable. In particular, resins having the adhesive property with a substrate such as polyester resin, urethane resin, acrylic resin and the like are preferable.

An amount of a particle to be added is 0.1 to 30 parts by weight, preferably 1 to 5 parts by weight relative to 100 parts by weight of a binder resin. When an amount of a particle is less than that, the anti-block effects are lowered while when an amount of a particle is larger than it, the heat converting effects are lowered.

The thickness of an anti-blocking layer is usually 0.2 to 20 μm, preferably 0.5 to 10 μm.

In the construction of the aforementioned laser-type thermal transfer sheet, that is, the construction of substrate/photo-thermal converting layer/peeling layer/transferable electrically-conductive layer, a metal thin layer of vacuum deposition may be formed in stead of a transferable electrically-conductive layer which is made from the transferable ink containing binder resin.

In the laser light used in the above laser-type thermal transfer sheet, the scanning and exposure are preferably perfomed by a beam spot condensed in a diameter of 5 to 100 μm from the semiconductor laser which makes a resonance of near infrared light of 680 to 1100 nm.

In one embodiment of the transferring process, a dielectric material is laid and held on a surface of a material holding means (drum-type holding means) through a suction pore of the material holding means. Then, a laser-type thermal transfer sheet in which a photo-thermal converting layer and a transferable electrically-conductive layer are disposed on a substrate in this order is laid on the dielectric material with the transferable electrically-conductive layer brought into close contact with the dielectric material by means of pressure rolls. In this condition, recording process is performed by irradiating the laser light which is an optical writing means. Here, the laser light which is a writing means is scanned parallel with an axial direction of a drum.

Alternatively, a dielectric material is laid and held on a surface of a material holding means (plate-type holding means). Then, a laser-type thermal transfer sheet in which a photo-thermal converting layer and a transferable electrically-conductive layer are disposed on a substrate in this order is laid on the dielectric material and with the transferable electrically-conductive layer brought into close contact with the dielectric material. In this condition, recording process is performed by irradiating the laser light which is an optical writing means. Here, the laser light which is an optical writing means is scanned in a X and Y directions.

The aforementioned embodiments using the suction step can provides a high accuracy in positions of optical writing and recording because the dielectric material and the laser-type thermal transfer sheet are brought into close contact with each other by means of a vacuum joining means such as the drum-type or plate-type holding means, thus forming a coil-like circuit and a condenser electrode circuit having the high accuracy in the dimensions and positions.

By varying an amount and irradiation area of a laser light, the energy to be applied can be changed.

When a laser light with a diameter of 5 to 100 μm is irradiated while bringing a transferable electrically-conductive layer of a laser-type thermal transfer sheet into contact with a dielectric material, a laser light may be irradiated from the thermal transfer sheet side to form a circuit pattern, or a laser light is irradiated from the dielectric material side to form a circuit pattern. For example, when recording is performed by irradiating a laser light from the thermal transfer sheet side, a laser light is irradiated to the photo-thermal converting layer via the substrate of the thermal transfer sheet, and accordingly it is preferable that the substrate contains no material absorbing a laser light. In addition, when a laser light is irradiated from the dielectric side to form a circuit pattern, a laser light is irradiated to a transferable electrically-conductive layer and a photo-thermal converting layer via the dielectric material, and accordingly, it is preferable that the dielectric material and the transferable electrically-conductive layer contain no material absorbing a laser light. This is to make a laser light to be effectively converted into the heat in a photo-thermal converting layer by the laser irradiation.

As a thermal transfer sheet having a transferable electrically-conductive layer, a sheet in which a metal deposition layer is provided on a substrate via a peeling layer, and a sheet in which a photo-thermal converting layer composed mainly of a near infrared absorbing material and a binder resin and a transferable electrically-conductive layer containing a binder resin are provided on a substrate in this order are explained above. Furthermore, any thermal transfer sheets, from which an electrically-conductive layer can be transferred by thermal transfer (thermal head recording, laser recording and the like), without departing from a range of the present invention can be used, being not limiting.

Manufacturing of Resonance Circuit

In a process for manufacturing a resonance circuit of the present invention, a thermal transfer sheet having a transferable electrically-conductive layer (electrically-conductive layer transfer sheet) is laid on one surface of a dielectric material so as to face the transferable electrically-conductive layer to the dielectric material, and the transferable electrically-conductive layer is thermally transferred to the dielectric material in a predetermined pattern to form a coil-like circuit, and the electrically-conductive layer transfer sheet is further laid on the other surface of a dielectric material so as to face the transferable electrically-conductive layer to the dielectric material, and then the transferable electrically-conductive layer is thermally transferred to the dielectric material in a predetermined pattern to form a condenser electrode plane circuit or a coil-like circuit which also serves as a condenser.

In one embodiment of the thermal transfer, a thermal transfer sheet in which a metal deposition layer is provided on a substrate via a peeling layer is used, and the metal deposition layer is thermally transferred to a dielectric material by means the thermal head or the like. In the other embodiment, a laser-type thermal transfer sheet in which a photo-thermal converting layer composed mainly of a near infrared absorbing material and a binder resin and a transferable electrically-conductive layer are provided on a substrate in this order or the other laser-type thermal transfer sheet in which the aforementioned photo-thermal converting layer, a peeling layer and a metal deposition layer are provided on a substrate in this order is used, and either the electrically-conductive layer or the metal deposition layer is thermally transferred to a dielectric material by irradiation of the laser light.

When the aforementioned coil-like circuit and condenser electrode circuit are formed by means of the thermal head, it is preferable that the tension controlling is appropriately performed so that expansion, contraction, crease and the like do not occur in a dielectric material and a thermal transfer sheet upon heating while laying the thermal transfer sheet on the dielectric material with the metal deposition layer brought into contact with the dielectric material. In addition, it is preferable that a thermal head is selected and controlled so that the recording density and the recording accuracy become high.

In the laser light thermal transfer system, it is preferable that the accuracy of the recording position is improved by joining a dielectric material and a laser-type thermal transfer sheet by means of the vacuum joining means or the like upon performing the optical writing, and by scanning and exposing with a beam spot condensed to a diameter of around 5 to 50 $\mu$m from the semiconductor laser light which makes a resonance of the near infrared light of 680 to 1100 nm.

In such the process for manufacturing a resonance circuit, when a coil-like circuit is formed on at least one side of a dielectric material and a condenser electrode circuit or a coil-like circuit which also serves as a condenser is formed on the other side of a dielectric material by thermally transferring the electrically-conductive layer from the thermal transfer sheet to the dielectric material in the predetermined pattern, the thickness of an electrically-conductive layer which can be thermally transferred may be smaller as compared with the resonance circuit manufactured by the conventional method. In such a case, in order to maintain the predetermined resistance R, inductance L and capacitance C necessary for a resonance circuit and obtain a resonance frequency, the same place of a dielectric material may be heated more than twice via a thermal transfer sheet by means of the thermal head. Upon carrying out this manner, it is preferable that an unused portion of a thermal transfer sheet is used every time.

Furthermore, also in a laser-type thermal transfer system, the same place of a dielectric material may be irradiated more than twice with the laser light via a thermal transfer sheet. Upon this, it is preferable that an unused portion of a thermal transfer sheet is used every time.

When thermally transferring of the electrically-conductive layer is repeated more than twice at the same portion on the dielectric material, the thickness of the transferred electrically-conductive layer can be larger, and the predetermined resistance R, inductance L and capacitance C can be maintained to obtain a required resonance frequency.

By the above process for manufacture, a coil-like circuit and a condenser electrode circuit can be formed on both sides of a dielectric material to obtain a resonance circuit.

This circuit (resonance circuit, LC circuit) can makes a resonance with the high-frequency wave transmitted from outside to dispatch an echo wave. The resonance circuit has a coil and a condenser, and makes a resonance with a high-frequency wave (electromagnetic wave and the like).

A sensor for such the resonance circuit has the function of transmitting the electromagnetic wave of the particular frequency to the resonance circuit, and receiving an echo wave dispatched from the resonance circuit making a resonance with the electromagnetic wave having the same frequency as that from the sensor. And, the resonance circuit is detected with the sensor, and the detected reception signal is converted into the particular signal for transporting of articles and discrimination management in the transporting and distributing step to be employed for various uses.

According to a process for manufacturing the resonance circuit relating to the present invention, a resonance circuit having the high dimensional and positional accuracy of parts and the stable resonance property and, additionally, which is thin and rich in the flexibility can be easily and effectively manufactured.

A resonance circuit of the present invention obtained by the above process has the high dimensional and positional accuracy of parts and the high stable resonance property and, for example, it can be applied for a resonance tag and card. In addition, since a resonance circuit of the present invention is thin and flexible, it can be utilized as a perceiving mark for thin articles such as a thermal transfer sheet. Further, a resonance circuit of the present invention had the high productivity.

As one method of using a resonance circuit of the present invention as an approval mark of a thermal transfer sheet of the present invention, for example, a resonance circuit which is equipped with at least a dielectric material, a coil-like circuit arranged on one side of the dielectric material, a condenser electrode circuit or a coil-like circuit which also serves as a condenser arranged on the other side of the dielectric material and, at the same time, which is formed by using an electrically-conductive layer transfer sheet having a thermally transferable electrically-conductive layer and thermally transferring the coil-like circuit, the condenser electrode circuit and the coil-like circuit which also serves as a condenser on the dielectric material in the predetermined pattern is separately prepared in advance, and such the resonance circuit is fixed to an arbitral position of a thermal transfer sheet, preferably to a front end of a thermal transfer sheet by sticking or another manner.

In this case, a resonance circuit may be directly fixed to the face side or the rear side of a front end of a thermal transfer sheet. Alternatively, a lead film to which a resonance circuit is fixed may be connected to a front end of a thermal transfer sheet.

As an another method, a resonance circuit integrated with a lead film is prepared in advance in such manner that a coil-like circuit is formed on one side of a lead film which can function as a dielectric material by using an electrically-conductive layer transfer sheet having a thermally transferable electrically-conductive layer, and thermally transferring the thermally transferable electrically-conductive layer on the dielectric material in the predetermined pattern and, at the same time, a condenser electrode circuit or a coil-like circuit which also serves as a condenser is formed on the other side of the lead film by using an electrically-conductive layer transfer sheet having a thermally transferable electrically-conductive layer, and thermally transferring the thermally transferable electrically-conductive layer on the dielectric material in the predetermined pattern. And a lead film integrated with such the resonance circuit is connected to a front end of a thermal transfer sheet.

Further, by using a deposition layer of a low melting point metal or an electrically-conductive ink layer containing a low melting point binder resin as a thermally transferable electrically-conductive layer of an electrically-conductive transfer sheet, a resonance circuit can be formed so as to be destructed by the energy applied from the outside, particularly, the heat from a recording part of a printer.

What is claimed is:

1. A process for manufacturing a resonance circuit comprising the steps of:

overlaying an electrically-conductive layer transfer sheet having a thermally transferable electrically-conductive layer on one side of a dielectric material with the thermally transferable electrically-conductive layer facing with the dielectric material surface, and then thermally transferring the thermally transferable electrically-conductive layer on the dielectric material in the predetermined pattern to form a coil-like circuit; and, overlaying the electrically-conductive layer transfer sheet on the other side of the dielectric material with the thermally transferable electrically-conductive layer facing with the dielectric material surface, and then thermally transferring the thermally transferable electrically-conductive layer on the dielectric material in the predetermined pattern to form a condenser electrode circuit or a coil-like circuit which also serves as a condenser.

* * * * *